H. D. LAYMAN.
REFRIGERATOR AND HEATER OR COOKER.
APPLICATION FILED APR. 29, 1914.
1,174,169.
Patented Mar. 7, 1916.
2 SHEETS—SHEET 1.
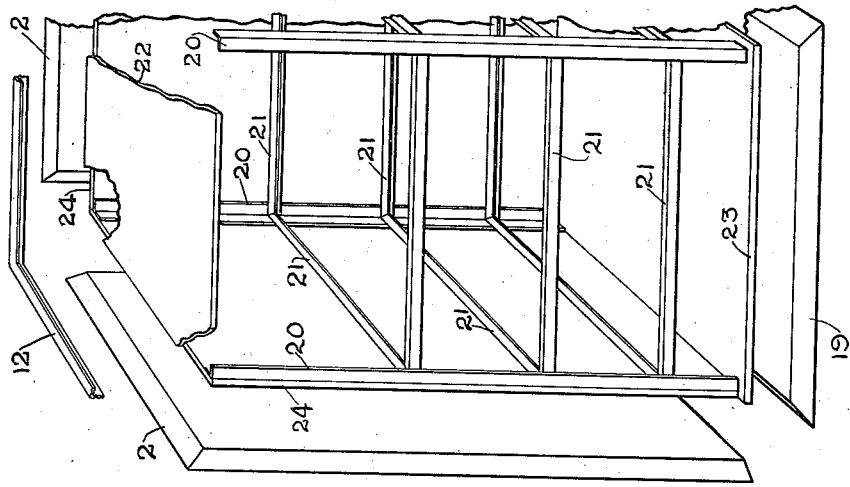
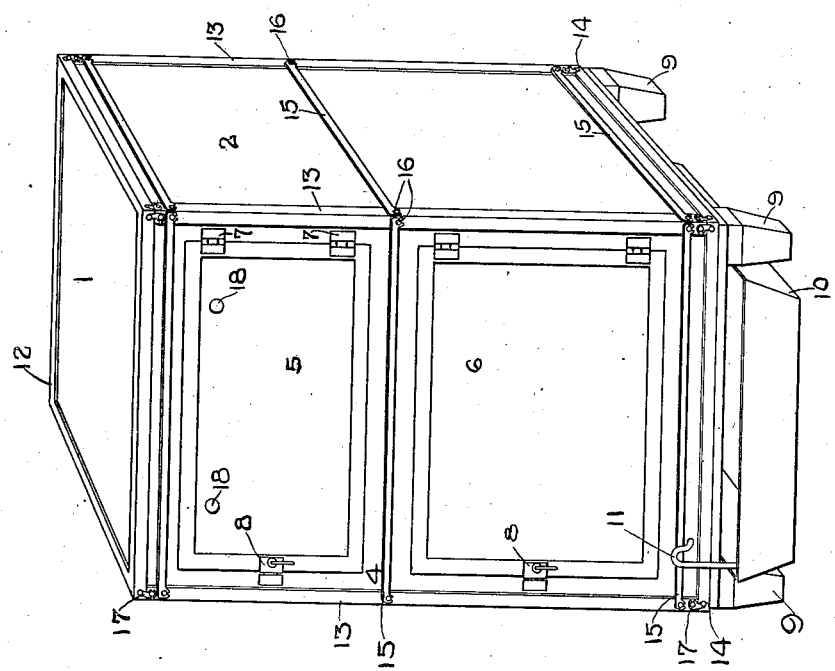

H. D. LAYMAN.
REFRIGERATOR AND HEATER OR COOKER.
APPLICATION FILED APR. 29, 1914.
1,174,169.
Patented Mar. 7, 1916.
2 SHEETS—SHEET 2.
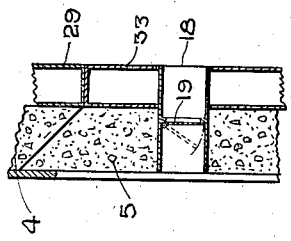
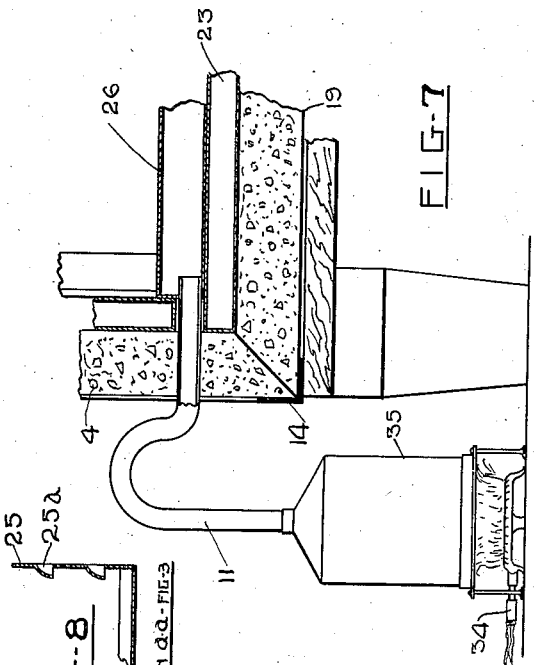
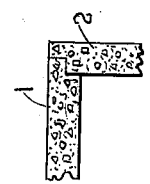
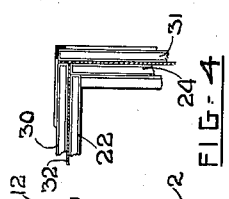
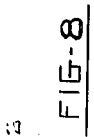
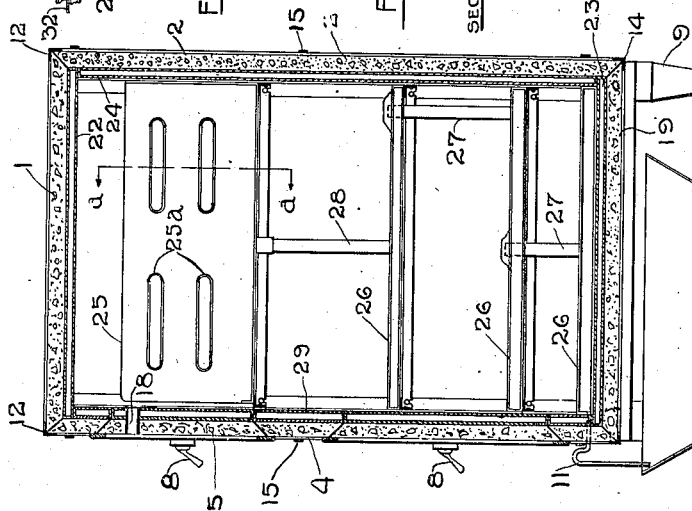
WITNESSES:
INVENTOR
Hiram Douglas Layman

UNITED STATES PATENT OFFICE.

HIRAM DOUGLAS LAYMAN, OF NEW YORK, N. Y.

REFRIGERATOR AND HEATER OR COOKER.

1,174,169. Specification of Letters Patent. Patented Mar. 7, 1916.

Application filed April 29, 1914. Serial No. 835,071.

*To all whom it may concern:*

Be it known that I, HIRAM DOUGLAS LAYMAN, a citizen of the United States, residing at New York, N. Y., have invented certain new and useful Improvements in Refrigerators and Heaters or Cookers, of which the following specification is a full, clear, and exact description, such as will enable others skilled in the art to make and use the same.

This invention relates to a refrigerator or steam or water cooker or heater and has for its object a provision of means whereby it may be readily converted from a refrigerator into a portable heater or cooker or vice versa.

Another object is the provision of means whereby the refrigerator or cooker or heater may be readily disassembled for disinfection and cleaning purposes and for convenience in transporting and the like.

Another object is to provide in a refrigerator or cooker, a construction whereby the entrance of bad air is restricted.

Another object is to provide in a refrigerator or heater or cooker a new efficient, cheap, sanitary and novel construction.

Other objects will appear from the description taken in connection with the drawings which form a part of the specification and more particularly will be pointed out in the claims appended to the specification.

By way of exemplification I show in the drawings, in Figure 1, a perspective elevation of the exterior of a refrigerator or steam or water cooker or heater embodying the invention. Fig. 2, is a perspective elevation, partly sectioned, of the inner framework and the outer walls, the bottom and a part of the outer frame-work of the refrigerator or heater shown in Fig. 1. Fig. 3, is a sectional view of a refrigerator or heater substantially similar to Fig. 1. Fig. 4, is a detailed section of a modification of the walls of the refrigerator or heater. Fig. 5, is a detailed section showing the manner in which I may join the outer insulation of a refrigerator or heater such as in Fig. 3. Fig. 6, shows a detailed modification of a relief valve and which is likewise shown in Fig. 3. Fig. 7, is a detailed section of the elevation of a refrigerator or heater such as in Fig. 3, and showing the manner in which I may connect means for supplying hot water or steam to the structure to convert it into a steam or hot water cooker or heater. Fig. 8, is a section along the lines "d—d" of Fig. 3 showing the side wall of box or pan or bin used to contain the ice.

In the drawings like numerals refer to like elements.

In Fig. 1, 1 is the top-most outer wall. 2 is the outer-most side walls. 4 is the outer-most front wall to which are fitted the doors 5 and 6, which doors may have hinges and locks 7 and 8 respectively. 9 are feet used to raise the refrigerator or heater sufficiently from the floor to admit of the entrance thereunder of a pan 10 to hold the water which may drain from the ice melting in the box through the vent pipe 11. 12 is a rectangular frame formed preferably of angle steel which with the other elements immediately hereafter enumerated composes the detachable outer frame-work which is a part of the invention. 13 are the four (4) corner up-rights similarly formed of angle steel. 14 is the bottom rectangular frame-work corresponding to the top frame 12. 15 are cross-pieces which are used to connect the several elements forming the outer frame-work. In the drawing I have shown the elements 15 connected to the up-rights 13 by means of obvious well known hook 16. I have shown the rectangular frames 12 and 14 detachably fastened to the up-rights 13 by means of swivel hooks 17. 18 are air vents more particularly referred to hereafter in reference to Figs. 3 and 6.

In Fig. 2, I show again the outer-most side walls 2 which, for the present purposes, may be assumed to be flat sheets of thick cork. 19 is the bottom outer wall corresponding to the top wall 1 and of similar substance to the walls 2. 20 are vertical angles which with the cross-pieces 21 comprises an inner detachable frame. This frame practically corresponds to and duplicates the outer frame previously referred to. 22 and 23 are respectively the top and the bottom inner walls which abut against the ends of the up-rights 20 but are inclosed by the outer insulations 1 and 19. 24 are the vertical inner side walls substantially similar to the inner end walls just referred to. These inner side walls 24 inclose the inner frame-work forming therewith a light, rigid structure, and all are inclosed by the outer walls 2 and front walls 4.

In Fig. 3, the top wall 1, the bottom wall 19 and side wall 2 and the front wall 4, all outer walls, are shown as assembled and held together by the rectangular frames 12 and 14, and the cross frames 15, and inclosing the inner walls in the detachable framework shown in Fig. 2. 25 is a pan or bin used to contain the ice. This pan I form preferably from sheet steel. I show the side walls having vents 25ª for the free circulation of air. 26 are horizontal shelves, hollow, preferably formed of sheet metal and detachable. These shelves have been shown and claimed by me in U. S. Patent #1,090,925 issued May 24th, 1914. As in that patent I show the several shelves connected by vertical pipes corresponding to the pipes 27 of Fig. 3 herewith, I need not here describe further their operation. 28 is a vertical pipe connecting the top-most shelf with the ice pan or bin 25. In this Fig. 3, I show a bent drain pipe 11 issuing from the front wall of the box and arranged to empty the water drained there through into the pan 10. As I arrange this waste pipe it forms an efficient trap forbidding the passage of dust and germ-laden air into the food compartments as is common to all refrigerators. In the conventional refrigerator design the cold and consequently heavy air which would normally pertain within the refrigerator is permitted somewhat to flow from the box through the open end of the common drain pipe fitted in such box. My drain pipe 11 is so arranged that it does not provide a means for the exhaust of cold air from or entrance of warm air into the refrigerator. In this Fig. 3, as in Fig. 2, I show the inner walls 24 and the top and bottom inner walls 22 and 23 and the front inner wall 29 each as being formed of a separate hollow closed structure having independent air tight walls. I have shown these elements as being formed of sheet metal. I thus provide as heat insulation vacuum walls which are further incased by additional heat insulating walls 1, 2, 4 and 19. I have shown these latter walls as sheets of cork. In this connection it should be noted that the rectangular frames 12 and the up-rights 13 serve effectually to seal the joints formed by the outer cork walls.

In Fig. 4, I have shown the inner vacuum walls 22 and 24 as fitted with outer vacuum walls 30 and 31 respectively, which replace the cork walls 1, and 2 of Fig. 3. Between the inner and outer vacuum walls I show additional heat insulating means 32, preferably cork.

In Fig. 5, I show a detailed section of a method I may use for forming a step joint for the outer walls 1 and 2. Such a joint is more effective than the simpler angular joint of Figs. 2 and 3.

In Fig. 6, I show a section through the door 5 which is fitted in the front wall 4. It will be seen here that the inner front vacuum wall 29 has a rectangular opening formed in it corresponding to the smallest diameter of the door 5, and that the corresponding vacuum sections 33 are free to move with door 5. I may, however, form these elements 5 and 33 as independent doors. 18 is an air passage fitted with a valve 19 which is arranged to admit of the flow of air outward from the box when the air within is expanded when the box is used as a steam or hot water cooker.

In Fig. 7, I show a diagrammatic burner or boiler 34 and 35 connected to the vent pipe 11 which in turn is tightly joined to lower shelf 26 of Fig. 3. By this means I may cause the horizontal shelves 26 to be filled with steam or hot water, the box with its inclosing top, bottom and side walls thus serve to form an efficient furnace or stove or cooker.

Heretofore I have referred to the outer frame-work and the outer and inner walls as being detachable. Obviously I may, by the removal of these outer walls, doors, etc., use the inner frame-work and the horizontal shelves in combination with some such burner as 34 and boiler such as 35 for heat radiation purposes. That is, by the removal of the walls I may convert the box into an efficient and portable steam or heat radiator or into a series of such radiators.

I have described the outer frame-work as composed of two rectangular frames, vertical angle pieces and cross tie pieces, but it must be understood that I am not limited to the manner, nor to the form nor to the number of pieces composing the detachable outer frame-work. Also that I have shown the hooks for the cross tie pieces and the hinges and hooks for the rectangular frames, only by way of example and that in substitution for this I may use any known form of hook, lock, turn-buckle, clamp or whatever means for readily and detachably joining together the elements of the frame-work.

I have shown the inner walls of the box as made of steel, and in Fig. 3, show the insulation as consisting of the combination of vacuum spaces and heat resisting cork, while in Fig. 4, I have shown and have described a modification. It should be understood that I do not limit myself to either of these arrangements of walls and insulating means, but may elect to use any known substitute for either or both.

I have previously referred to the shelving and inner walls and ice pan and a drain pan as formed of sheet metal. I prefer thus to form these and I also prefer that each of the elements shall be made wholesome and sanitary and pleasing by being enameled, but I do not limit myself to so forming and finishing these elements.

I have shown the inner frame-work as separate from the inner walls, but it is obvious that I may connect the uprights 20 and the cross pieces 21 directly to the detachable side walls, if I so elect. In this event the purposes of the steam radiator will be met if I arrange for the top walls alone to be detachable.

The gas burner 34 and the boiler 35, as previously stated, are but diagrammatic. I may substitute for this any known means for supplying steam, hot air, hot water or other fluid to the piping or shelving or the like, and may incorporate any known means for determining and regulating the pressure, the temperature and the volume of such steam, air, water or other fluid.

I claim:

1. A device of the character described comprising a top, a bottom, corner uprights connected to said top and bottom, detachable side walls interposed between the top and bottom and engageable with the corner uprights, and cross bars terminating in hook members detachably engageable with the uprights for maintaining the side walls in applied position.

2. A device of the character described comprising a top, a bottom, corner uprights detachably connected to said top and bottom, detachable side walls interposed between the top and bottom and engageable with the corner uprights, and cross bars terminating in hook members detachably engageable with the uprights for maintaining the side walls in applied position.

3. A device of the character described comprising a top, a bottom, side walls, corner posts connecting the top and bottom and angular in cross section whereby said posts overlie the adjacent margins of the sides, a detachable frame resting upon the top, and swivel hook members carried by the frame and coacting with the uprights for maintaining the frame and the top in applied position.

4. A device of the character described comprising a top, a bottom, side walls, corner posts connecting the top and bottom and angular in cross section whereby said posts overlie the adjacent margins of the sides, a frame in which the bottom section rests, and swivel hook members carried by the frame and coacting with the uprights for detachably maintaining said frame and bottom in applied position.

In testimony that I claim the foregoing as my invention I have signed my name in presence of the subscribing witnesses this 28" day of April, 1914.

HIRAM DOUGLAS LAYMAN.

Witnesses:
DANIEL LINDEN,
L. V. PELTON.